United States Patent Office 3,542,882
Patented Nov. 24, 1970

3,542,882
CHLORINATED PHENOLS
Brian M. Ashall, Wingerworth, Chesterfield, Derbyshire, Herbert F. Bondy, Upper Newbold, Chesterfield, Derbyshire, and Vernon Kelsey, Brimington Common, Chesterfield, Derbyshire, England, assignors to Coalite and Chemical Products Limited, Bolsover, Chesterfield, Derbyshire, England, a British company
No Drawing. Filed Aug. 20, 1964, Ser. No. 391,032
Claims priority, application Great Britain, Aug. 30, 1963, 34,475/63
Int. Cl. C07c 39/27
U.S. Cl. 260—623
7 Claims

ABSTRACT OF THE DISCLOSURE

The invention is directed to a process for the chlorination of certain phenols, such as 3,4-dimethylphenol, by contacting the phenol while in a molten state with certain chlorinating agents, such as sulphuryl chloride, in the presence of certain catalysts, such as copper chloride.

---

The invention relates to a method for the production of nuclear chlorinated phenols.

According to thhe invention a method for the production of a chloro-phenol, particularly a chloro-xylenol, comprises subjecting a phenol in the molten state to chlorination, preferably with a normally liquid, non-oxidising chlorinating agent, in the presence of a halogen carrier or catalyst. It will be understood that the chlorination is carried out under such conditions of temperature as to favour nuclear chlorination rather than side-chain chlorination.

The method of the invention is particularly suitable for the mono-chlorination of 3,4-dimethylphenol. The preferred chlorinating agent is sulphuryl chloride and the preferred catalyst is a metal chloride, particularly anhydrous cupric chloride. By the mono-chlorination of 3,4-dimethylphenol in this manner, the proportion of 6-chloro-3,4-dimethylphenol in the product can be increased at the expense of the 2-chloro isomer.

The temperature at the beginning of the chlorination will be such as to maintain the phenol in the molten state. With 3,4-dimethylphenol, the inital temperature is suitably 65–70° C. During the course of the chlorination, the temperature of the reaction mixture is preferably slowly lowered, for example to about 40° C., whilst maintaining the mixture in the liquid phase. The chlorinating agent is advantageously added gradually to the phenol during the course of the reaction.

The chlorination product is then preferably treated with steam for a period sufficient to stabilise it. The condensed water is separated from the product and the organic phase is subjected to distillation under reduced pressure and a fraction rich in mono-chlorinated phenol is recovered.

The invention further provides a method of separating a mixture of 6-chloro- and 2-chloro-3,4-dimethylphenols which comprises selectively sulphonating the 2-chloro isomer, for example with concentrated sulphuric acid. The temperature during the selective sulphonation is suitably in the range 70–110° C. The product of the selective sulphonation may then be mixed with water; the sulphonated 2-chloro isomer passes into solution whilst the 6-chloro isomer remains undissolved. The 6-chloro-3,4-dimethylphenol may in this manner be obtained in a purity of above 95%. The yield, based on the 6-chloro-3,4-dimethylphenol in the feed before selective sulphonation, may be 90% or higher.

The invention thus provides a method whereby 6-chloro-3,4-dimethylphenol may be obtained from 3,4-dimethylphenol in a good state of purity and in a relatively simple manner.

The invention is illustrated in the following examples.

EXAMPLE 1

1,700 lbs. molten 3,4-dimethylphenol was charged to a glass-lined, jacketted vessel fitted with an agitator, a dip tube and a gas vent. 42½ lbs. anhydrous cupric chloride was added to the phenol in the vessel, the contents of the vessel being maintained at 65° C. 112 gallons sulphuryl chloride was fed through the dip pipe over a period of 10 hours during which time the temperature of the reaction mixture was lowered from 65° C. to 40° C. The mixture was kept at 40° C. for 1 hour before transferring it to another similar glass-lined vessel. Steam was blown into the material for 8 hours at a rate of 30 lbs. per hour. The water was separated off and the residue was distilled under vacuum to yield 1,360 lbs. of a distillate containing over 60% 6-chloro-3,4-dimethylphenol.

EXAMPLE 2

The distillate obtained in Example 1 had the following composition:

| | Percent |
|---|---|
| 6-chloro-3,4-dimethylphenol | 60 |
| 2-chloro-3,4-dimethylphenol | 31 |
| Others | 9 |

100 lbs. of the distillate were heated to 80° C. and 1.4 gallons of 98% w./w. sulphuric acid were added whilst stirring. The temperature of the mixture was then raised to 95% C. with continued stirring.

The hot mixture was then run into 50 gallons of cold water with vigorous stirring, when the 6-chloro-3,4-dimethylphenol crystallised immediately and the other, sulphonated material, dissolved.

A few hours digestion were allowed before the crystals were removed the the centrifuge. The crystals were washed with clean water and then air-dried and weighed, and their melting point was determined.

Weight of dried crystals—55.2 lbs.
Yield of available 6-chloroisomer—92%
Melting point—70.7° C.
Purity—95%

We claim:
1. A process for the catalytic production of 6-chloro-3,4-dimethylphenol, which comprises monochlorinating 3,4-dimethylphenol to a mixture of the 2-chloro- and 6-chloro-3,4-dimethylphenol isomers by contacting 3,4- dimethylphenol in a molten state, at an initial temperature in the range of 65° to 70° C., with sulphuryl chloride in the presence of a copper chloride as a catalyst, contacting the resulting mixture of isomers with concentrated sulphuric acid at a temperature of from about 70° to 110° C. to effect sulphonation of the 2-chloro isomer in the mixture without sulphonating the 6-chloro isomer, extracting the sulphonated 2-chloro isomer from the sulphonation mixture and recovering 6-chloro-3,4-dimethylphenol from the mixture.

2. A process according to claim 1, in which the catalyst is anhydrous cupric chloride.

3. A process according to claim 1, in which the chlorination of the 3,4-dimethyl phenol is initially carried out at a temperature in the range 65–70° C. and as monochlorination of the phenol proceeds the temperature of the reaction mixture is gradually reduced whilst retaining the mixture in the liquid phase.

4. A process for removing a phenol of the formula:

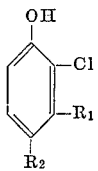

wherein $R_1$ and $R_2$ are methyl, from a mixture comprising said phenol and an isomeric phenol of the formula:

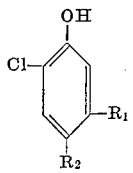

wherein $R_1$ and $R_2$ are as defined above, which comprises the steps, (1) contacting said mixture with at least one molecular equivalent of a sulfonating agent per molecular equivalent of the phenol to be removed to produce a mixture of sulfonated and unsulfonated phenols, and (2) separating the sulfonated phenols from said mixture of sulfonated and unsulfonated phenols.

5. The process of claim 4 wherein said sulfonating agent is concentrated sulfuric acid.

6. The process of claim 5 wherein step (2) comprises addition of water to the mixture of sulfonated and unsulfonated phenols, followed by separation of the resulting aqueous and non-aqueous phases.

7. A method of separating a mixture of 2-chloro-3,4-dimethylphenol and 6-chloro-3,4-dimethylphenol into its component parts, which comprises contacting the mixture with concentrated sulphuric acid at a temperature of from about 70° to 110° C. to selectively sulphonate the 2-chloro-3,4-dimethylphenol without sulphonating the 6-chloro-3,4-dimethylphenol, intimately contacting the resulting sulphonated mixture with water in an amount sufficient to dissolve the sulphonated 2-chloro-3,4-dimethylphenol, intimately contacting the resulting sulphonated mixture with water in an amount sufficient to dissolve the sulphonated 2-chloro-3,4-dimethylphenol, and recovering the 6-chloro-3,4-dimethylphenol from the mixture.

References Cited

UNITED STATES PATENTS

| 2,350,677 | 6/1944 | Gladden | 260—623 |
| 3,256,350 | 6/1966 | McCall et al. | 260—649 |
| 3,401,205 | 9/1968 | Yoon | 260—623 |

FOREIGN PATENTS

| 948,601 | 2/1964 | Great Britain. |

BERNARD HELFIN, Primary Examiner

W. B. LONE, Assistant Examiner

U.S. Cl. X.R.

260—503

PO-1050
(5/69)

UNITED STATES PATENT OFFICE
CERTIFICATE OF CORRECTION

Patent No. 3,542,882                    Dated November 24, 1970

Inventor(s) Brian Michael Ashall, Herbert Frederick Bondy, Vernon

It is certified that error appears in the above-identified patent and that said Letters Patent are hereby corrected as shown below:

Column 1, line 47, change "inital" to - - initial - -

Column 2, line 15, after the word "The" insert - - reaction -

Column 2, line 42, delete the first "the" and insert therefor the word - - at - -

Column 4, lines 10-12, delete the phrase "intimately contacti the resulting sulphonated mixture with water in an amount sufficient to dissolve the sulphonated 2-chloro-3,4-dimethylp (This phrase inadvertently repeats what is found in lines 7-1 of patent Claim 7).

SIGNED AND
SEALED
MAR 9 1971

(SEAL)
Attest:

Edward M. Fletcher, Jr.
Attesting Officer

WILLIAM E. SCHUYLER, JR.
Commissioner of Patents